June 12, 1934.    H. S. BAIRD    1,962,474
SCANNING DEVICE FOR TELEVISION
Filed July 16, 1931
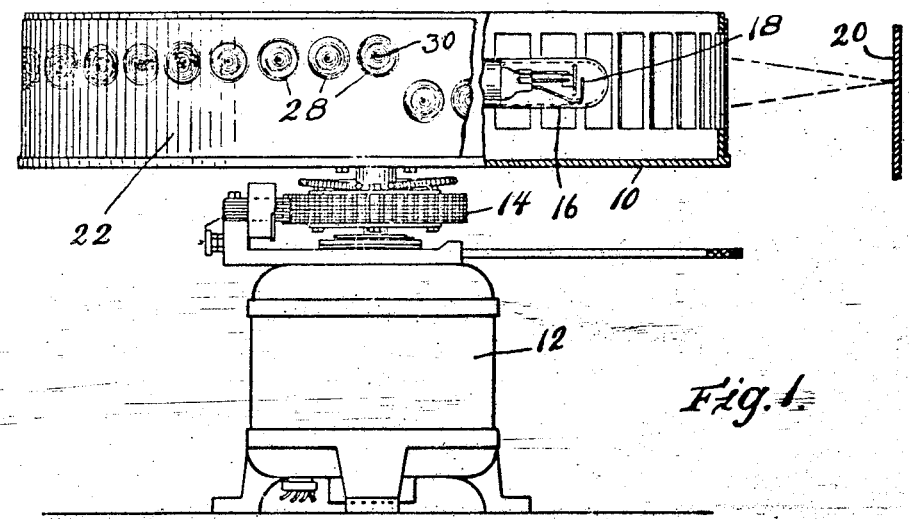
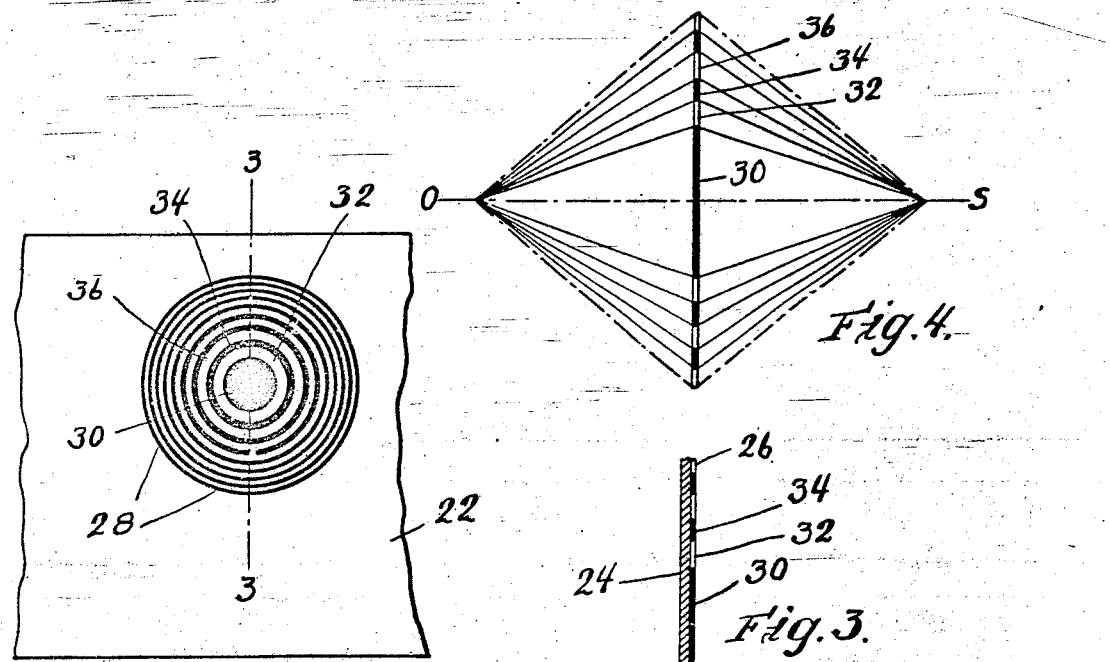
Inventor
Hollis S. Baird Patented June 12, 1934

1,962,474

UNITED STATES PATENT OFFICE 1,962,474

SCANNING DEVICE FOR TELEVISION

Hollis S. Baird, Boston, Mass., assignor to Shortwave & Television Corporation, Boston, Mass., a corporation of Delaware Application July 16, 1931, Serial No. 551,079

12 Claims. (Cl. 178—6)

This invention relates to television and particularly to scanning devices which are adapted to reconstruct a televised image upon a viewing surface.

A scanning device usually comprises a member having a series of windows which are moved repeatedly at a suitable speed between a surface on which the reconstructed televised image is developed and a light source which is varied in intensity in accordance with the television signals.

One of the problems in television is that of obtaining a bright illumination of the reconstructed image. The variable light source usually comprises a gaseous conduction, as a neon lamp having a glowing surface the intensity of illumination of which is rather low. The scanning device ordinarily has had windows comprising minute perforations in an opaque back ground, so that the amount of light transmitted through the perforations onto the viewing surface is small.

It has been proposed to employ as scanning windows, lenses which are large in diameter as compared with the perforations, so as to gather a large amount of light and focus it onto a point which is swept across the viewing surface. For the successful use of lenses, it is necessary that they all shall have the same focal length as otherwise some lenses will present parts of the picture out of focus with the parts presented by other lenses. This is particularly true when it is considered that the variable light source usually is monochromatic so that the light rays come sharply to focus, and also when it is considered that the bands of focused light swept by successive lenses should neither overlap nor gap on the viewing surface or screen.

The focal length of a lens, however, is merely incidental to its manufacture, and is not a dimension of the lens that can be duplicated precisely in successive commercial lenses having otherwise reproducible dimensions. While the focal lengths of a number of lenses intended to be duplicates may be approximately the same, so that the manufacturer can list them all under the same focal length, pairs or more of them can not be used indiscriminately in uses where identity of focal length is a requisite. Thus the lenses must be matched for focal length. Since a scanning device may have as many as seventy-two or more windows, it is evident that a very large number of lenses must be made in order to find seventy-two lenses that have so accurately the same focus that they can be used in the same scanning device.

Thus the cost of the lenses, themselves, is so prohibitive that a scanning device employing them can not be sold in competition with the usual perforated scanning device, regardless of the inferior light-passing characteristics of the latter device.

Furthermore, the individual lenses must be so accurately mounted with respect to each other in the scanning device that the bands traced by them neither gap nor lap nor are out of focus on the viewing surface. Such accuracy of mounting is difficult and expensive.

The lenses are heavy and require a strong supporting member which must be accurately balanced and requires a substantial amount of power to operate and maintain operating in synchronism with the television signals.

I have discovered that an optical device, heretofore considered as being only of scientific interest and having heretofore no known commercial use, is exceptionally well suited for use in a scanning device. It can be made at insignificant cost, any number of precise duplicates can be made, and directly upon the scanning device as an integral part thereof with great accuracy of positioning without increasing the weight of the scanning device.

The particular type of device with which the present invention is concerned as incorporated in a scanning device is known in optics as a "zone plate", and comprises a transparent plate having a large plurality of concentric circular areas or zones which are equal in area and are alternately transparent and opaque so that light intercepted by the plate is, by a process of interference, brought to a definite focus. A zone plate is known in optics to illustrate certain principles of light interference but has had no commercial use so far as is known. A scanning device using zone plates as the light passing and concentrating windows of the device comprises an object of the present invention.

A further object of this invention is a scanning device, as an endless belt, having the zone plates photographically produced thereon in a reduced scale from a large size master plate, so that all zone plates are identical in all respects.

Another object is generally to improve the construction and operation of scanning devices.

Fig. 1 is a front elevation, partly in section, of a television receiving apparatus embodying a Fig. 2 is an enlarged plan view of a single zone plate of the scanning device.

Fig. 3 is a partial section taken along line 3—3 of Fig. 2.

Fig. 4 is a diagrammatic cross-section through a zone plate and illustrating the principle thereof.

The television receiving apparatus with which the form of scanning device herein described as embodying the present invention is associated comprises a scanning drum 10 driven by a variable speed assynchronous motor 12 and operated at a speed that is synchronous with the frequency of the incoming picture signals by a synchronous motor 14, as described in my copending application Serial No. 531,114, filed April 18, 1931. A light source of variable intensity, as the neon lamp 16, having a cathode 18 that, preferably, provides a point source of light, is located within the drum; and the picture or image is developed on the viewing surface or screen 20.

The periphery of the drum carries a scanning device 22 which, in accordance with the present invention, comprises an endless flexible band of photographic film consisting of a transparent band 24 of cellulose nitrate or acetate or equivalent having on one face a gelatin film 26 containing an originally light-sensitive material. The band is provided with scanning windows 28 which form a part of the present invention, and which windows are photographically developed in the band in a manner presently to be described.

The scanning windows are all identical and each comprises a zone plate, a plan view of one of which is illustrated in Fig. 2. Each zone plate is composed of a large plurality of concentric circular areas or zones 30, 32, 34, 36, etc., all of which are equal in area by having the radii of the successive circular areas proportional to square roots of the consecutive common numbers 1, 2, 3, etc.; and which areas are alternately opaque and transparent. Thus monochromatic light, emitted from the point S, Fig. 4, is intercepted by the opaque areas and passes through the transparent areas and comes to a focus at a point O. The principal focal length of the zone plate varies inversely as the number of alternate opaque and transparent areas or zones, directly as the square of the radius of the outermost zone, and inversely as the wave length of the light passed through the plate. A zone plate having three hundred zones the outer one of which has a radius of five millimeters and operating on light having a wave length of six tenths of a micron, has a focal length of one hundred thirty-nine millimeters.

The zone plates of the scanning belt are made by photographic processes from a master zone plate. The master comprises a photographically white surface of suitably large size having the zones drawn thereon in the manner above described, with alternate zones being photographically black. The size of the master may be anything desired, so that there is no difficulty in making the zones accurately. Images of the master, in suitably reduced size, are then photographed on the scanning belt. This is done by means of a camera containing the light-sensitive scanning belt and focused upon the illuminated master in much the same way that the photographically-produced windows of the scanning belt described and claimed in my copending application Serial No. 366,974, filed May 29, 1929, are made. Between each exposure of the film to the master, the film is advanced the same distance so that the distance between successive zone plates in the belt is the same. Also between each exposure the camera is raised or lowered vertically, as the case may be, the same distance so that the axes of successive zone plates are positioned one below the other and thus are arranged in a line that passes spirally around the belt. As an alternative arrangement, the master can be moved vertically by the same distance between successive exposures of the scanning belt, to obtain the same result. These movements can be made easily and very accurately by micrometer screws. The completely exposed scanning belt is then put through the usual photographic developing and fixing processes and thus contains negatives of the master. The back ground surrounding the master is white and the exposed areas of the belt are contiguous so that all portions of the belt between and around the zone plates are opaque.

By the use of the master and the photographic process of producing the zone plates on the belt, all the zone plates are optically indentical and can not fail to have the same focal length, as well as other optical characteristics, as light-passing ability and the like. This method of producing a multi-windowed, light-concentrating scanning device possesses an accuracy and economy that can not be approached by any known method of making a scanning device having lenses.

The scanning device thus described can be made commercially at small expense, has very little weight and is flexible so that all parts thereof can readily conform to the periphery of the scanning drum 10. The drum has circumferentially-elongated openings 40 located behind each zone plate and, if these openings are sufficiently elongated, the belt can assume a flat plane at these openings, so that the zone plates are flat if the diameter of the drum should render this arrangement desirable.

One master can produce zone plates having any desired focal length, it being necessary only to vary the amount of reduction of the image thereof in the photographic negative.

The zone plates can be close together in the scanning device so that they intercept a large lighted area and concentrate the light to a point.

I claim:

1. A scanning device for television having a series of light-concentrating devices comprising zone plates.

2. A scanning device for television having a series of identical optically formed light-concentrating devices.

3. A scanning device for television having a series of optically identical light-concentrating devices comprising zone plates.

4. A scanning device for television having a series of photographically-produced light-concentrating devices.

5. A scanning device for television having a series of photographically-produced light-concentrating devices comprising zone plates.

6. A scanning device for television having a series of flexible light-concentrating devices comprising zone plates.

7. A flexible scanning device for television having a series of scanning windows comprising zone plates.

8. A scanning device for television comprising an endless opaque belt having a series of scanning windows comprising zone plates.

9. A scanning device for television comprising an endless opaque belt having a series of scanning windows comprising zone plates which are photographically developed in the belt.

10. A scanning device for television having scanning windows each comprising a plurality of concentric transparent and opaque circular zones of equal area.

11. A scanning device for television having scanning windows each comprising a plurality of concentric transparent and opaque circular zones of equal area and each window having the same maximum radius and the same number of zones.

12. A scanning device for image transmission comprising a continuous strip of flexible material, a film of photographic emulsion thereon, and a plurality of zone-plates in said emulsion along said strip.

HOLLIS S. BAIRD.